United States Patent
Maltz et al.

(10) Patent No.: US 10,282,868 B2
(45) Date of Patent: May 7, 2019

(54) METHOD AND SYSTEM FOR GENERATING ACCURATE GRAPHICAL CHROMOPHORE MAPS

(71) Applicant: The Procter & Gamble Company, Cincinnati, OH (US)

(72) Inventors: Martin Sidney Maltz, Rochester, NY (US); Luisa Fernanda Polania Cabrera, Webster, NY (US); Paul Jonathan Matts, Surrey (GB); Ankur Purwar, Sunglade (SG)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/414,305

(22) Filed: Jan. 24, 2017

(65) Prior Publication Data
US 2017/0270691 A1    Sep. 21, 2017

Related U.S. Application Data (60) Provisional application No. 62/311,183, filed on Mar. 21, 2016.

(51) Int. Cl.
*G06K 9/00* (2006.01)
*G06T 11/00* (2006.01)
(Continued)

(52) U.S. Cl.
CPC .......... *G06T 11/001* (2013.01); *G06T 7/0014* (2013.01); *G06T 7/90* (2017.01);
(Continued)

(58) Field of Classification Search
CPC ....... G06T 11/001; G06T 7/90; G06T 7/0012; G06T 2207/10024; G06T 2207/30088
See application file for complete search history.

(56) References Cited

U.S. PATENT DOCUMENTS 5,983,120 A * 11/1999 Groner ................. A61B 5/0261
                                                              356/364
8,077,931 B1   12/2011 Chatman
(Continued)

OTHER PUBLICATIONS

Graham D. Finlayson, "Color by Correlation: A Simple, Unifying Framework for Color Constancy", IEEE Transactions on Pattern Analysis and Machine Intelligence, vol. 23, No. 11, Nov. 2001. pp. 1209-1221.*

(Continued)

*Primary Examiner* — Chong Wu
(74) *Attorney, Agent, or Firm* — John G. Powell (57) ABSTRACT

A method, non-transitory computer readable medium and apparatus for generating one or more graphical chromophore maps are disclosed. For example, the method includes receiving a plurality of images from a plurality of different customers, estimating a plurality of different illuminates that were used to capture each one of the plurality of images, calculating a correlation of a spectral reflectance of a lip region of a customer with an absorption curve of hemoglobin for the each one of the plurality of images for each one of the plurality of different illuminates that is estimated, selecting an illuminance of the plurality of different illuminates that provides a highest correlation and generating one or more graphical chromophore maps for subsequently received images of customers using the illuminance that is selected.

16 Claims, 5 Drawing Sheets

(51) Int. Cl.
*G06T 7/90* (2017.01)
*G06T 7/00* (2017.01)

(52) U.S. Cl.
CPC ............... *G06T 2207/10024* (2013.01); *G06T 2207/30088* (2013.01)

(56) References Cited

U.S. PATENT DOCUMENTS

| | | | |
|---|---|---|---|
| 2007/0071314 A1 | 3/2007 | Bhatti | |
| 2007/0104472 A1 | 5/2007 | Quan | |
| 2008/0080746 A1 | 4/2008 | Payonk | |
| 2008/0194928 A1 | 8/2008 | Bandic | |
| 2009/0245603 A1 | 10/2009 | Koruga | |
| 2010/0172567 A1 | 7/2010 | Prokoski | |
| 2011/0016001 A1 | 1/2011 | Schieffelin | |
| 2011/0196616 A1* | 8/2011 | Gunn ...................... | A61B 5/441 702/19 |
| 2012/0223131 A1 | 9/2012 | Lim | |
| 2013/0041733 A1 | 2/2013 | Officer | |
| 2013/0079620 A1 | 3/2013 | Kuth et al. | |
| 2013/0094780 A1 | 4/2013 | Tang et al. | |
| 2013/0158968 A1 | 6/2013 | Ash et al. | |
| 2014/0089017 A1* | 3/2014 | Klappert ................ | G06Q 10/02 705/5 |
| 2014/0201126 A1 | 7/2014 | Zadeh | |
| 2014/0209682 A1 | 7/2014 | Gottwals et al. | |
| 2014/0211022 A1 | 7/2014 | Koh et al. | |
| 2014/0219526 A1 | 8/2014 | Linguraru et al. | |
| 2014/0270490 A1 | 9/2014 | Wus et al. | |
| 2014/0334723 A1 | 11/2014 | Chatow | |
| 2015/0045631 A1 | 2/2015 | Pederson | |
| 2016/0162728 A1 | 6/2016 | Arai et al. | |
| 2017/0246473 A1 | 8/2017 | Marinkovich | |
| 2017/0270348 A1 | 9/2017 | Morgana et al. | |
| 2017/0270349 A1 | 9/2017 | Polania Cabrera et al. | |
| 2017/0270350 A1 | 9/2017 | Maltz et al. | |
| 2017/0272741 A1 | 9/2017 | Maltz et al. | |

OTHER PUBLICATIONS

Norimichi Tsumura, "Image-based skin color and texture analysis/synthesis by extracting hemoglobin and melanin information in the skin", ACM Transactions on Graphics (TOG) vol. 22 Issue 3, Jul. 2003. pp. 770-779.*
All Office Actions, U.S. Appl. No. 15/414,002.
All Office Actions, U.S. Appl. No. 15/414,095.
All Office Actions, U.S. Appl. No. 15/414,147.
All Office Actions, U.S. Appl. No. 15/414,189.
Finlayson et al., Color by Correlation: A Simple, Unifying Framework for Color Constancy, IEEE Transactions on Pattern Analysis and Machine Intelligence, vol. 23, No. 11, Nov. 2001, pp. 1209-1221.
Gong et al., Quantification of Pigmentation in Human Skin Images, IEEE, 2012, pp. 2853-2856.
Hyvarinen et al., A Fast Fixed-Point Algorithm for Independent Component Analysis of Complex Valued Signals, Neural Networks Research Centre, Helsinki University of Technology, Jan. 2000, 15 pages.
Hyvarinen et al., A Fast Fixed-Point Algorithm for Independent Component Analysis, Neural Computation, 9:1483-1492, 1997.
Ojima et al., Application of Image-Based Skin Chromophore Analysis to Cosmetics, Journal of Imaging Science and Technology, vol. 48, No. 3, May 2004, pp. 222-226.
Sun et al., Statistical Characterization of Face Spectral Reflectances and Its Application to Human Portraiture Spectral Estimation, Journal of Imaging Science and Technology, vol. 46, No. 6, 2002, pp. 498-506.
Tsumura et al., Image-based skin color and texture analysis/synthesis by extracting hemoglobin and melanin information in the skin, ACM Transactions on Graphics (TOG), vol. 22, Issue 3, Jul. 2003, pp. 770-779.

* cited by examiner

METHOD AND SYSTEM FOR GENERATING ACCURATE GRAPHICAL CHROMOPHORE MAPS

CROSS REFERENCE TO RELATED APPLICATIONS

This application claims priority under 35 U.S.C. § 119(e) to U.S. provisional patent application Ser. No. 62/311,183, filed on Mar. 21, 2016, which is hereby incorporated by reference in its entirety.

The present disclosure relates generally to facial image analysis and, more particularly, to a method and system for selecting an illuminance from the facial image analysis to generate accurate graphical chromophore maps.

BACKGROUND

Some companies are beginning to develop products or applications to improve a consumer's skincare experience. The applications look to provide product recommendations and navigation solutions. The applications can also provide personalized skincare for the customer by providing continuous support, educating the user about skin biology, tracking the customer's skin performance over time, and customizing product and regiment solutions to the customer's individual needs.

One challenge to providing such applications is an ability to receive an accurate image of the customer's face and providing an accurate analysis of the customer's face based on the image. Some solutions may require the customer to come to a lab or a studio of the company to take images with high quality cameras in a controlled light setting. However, requiring the customer to travel to another lab or studio is time consuming and inconvenient to the customer.

Another option may be to analyze images provided by the customer. However, images provided by the customer can have a large amount of variation in image quality and lighting. Many times the type of lighting that is used by the customer to take his or her own picture is unknown, which can lead to an inaccurate analysis of the image provided by the customer.

SUMMARY

According to aspects illustrated herein, there are provided a method, non-transitory computer readable medium and apparatus for generating one or more graphical chromophore maps. One disclosed feature of the embodiments is a method that receives a plurality of images from a plurality of different customers, estimates a plurality of different illuminates that were used to capture each one of the plurality of images, calculates a correlation of a spectral reflectance of a lip region of a customer with an absorption curve of hemoglobin for the each one of the plurality of images for each one of the plurality of different illuminates that is estimated, selects an illuminance of the plurality of different illuminates that provides a highest correlation and generates one or more graphical chromophore maps for subsequently received images of customers using the illuminance that is selected.

Another disclosed feature of the embodiments is a non-transitory computer-readable medium having stored thereon a plurality of instructions, the plurality of instructions including instructions which, when executed by a processor, cause the processor to perform operations that receive a plurality of images from a plurality of different customers, estimate a plurality of different illuminates that were used to capture each one of the plurality of images, calculate a correlation of a spectral reflectance of a lip region of a customer with an absorption curve of hemoglobin for each one of the plurality of images for the each one of the plurality of different illuminates that is estimated, select an illuminance of the plurality of different illuminates that provides a highest correlation and generate one or more graphical chromophore maps for subsequently received images of customers using the illuminance that is selected.

Another disclosed feature of the embodiments is an apparatus comprising a processor and a computer-readable medium storing a plurality of instructions which, when executed by the processor, cause the processor to perform operations that receive a plurality of images from a plurality of different customers, estimate a plurality of different illuminates that were used to capture each one of the plurality of images, calculate a correlation of a spectral reflectance of a lip region of a customer with an absorption curve of hemoglobin for the each one of the plurality of images for each one of the plurality of different illuminates that is estimated, select an illuminance of the plurality of different illuminates that provides a highest correlation and generate one or more graphical chromophore maps for subsequently received images of customers using the illuminance that is selected.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for generating one or more graphical chromophore maps. As discussed above, some companies are beginning to develop products or applications to improve a consumer's skincare experience. In doing so, an image of the customer can be used to analyze the health of the customer's skin. One way of analyzing the health of a customer's skin is to calculate chromophore concentrations in the skin as chromophore concentrations may be markers for various skin diseases and factors that may affect overall skin tone.

However, a proper illuminance should be estimated to perform an accurate analysis of chromophore concentrations in the skin, thereby, generating more accurate graphical chromophore maps. As noted above, the type of illuminance that is used for the images received from the customers is typically unknown.

Embodiments of the present disclosure provide a novel method and apparatus to estimate the illuminance based on a comparison of a variety of different illuminates that are estimated as being previously used to capture training images. The correlation coefficient can be calculated and averaged for the training images to select the illuminance with the highest correlation coefficient.

In one embodiment, the correlation coefficient may be based on a comparison of a spectral reflectance of a particular facial region (e.g., the lip region) and an absorption curve of a particular chromophore component (e.g., hemoglobin). For example, the present disclosure has found that the lip region is high in hemoglobin content. Therefore, an illuminance that provides a close correlation of the spectral reflectance of the lip region to the absorption curve of hemoglobin will provide accurate analysis for chromophore separation and graphical chromophore map generation for subsequently received images.

Figure 1:
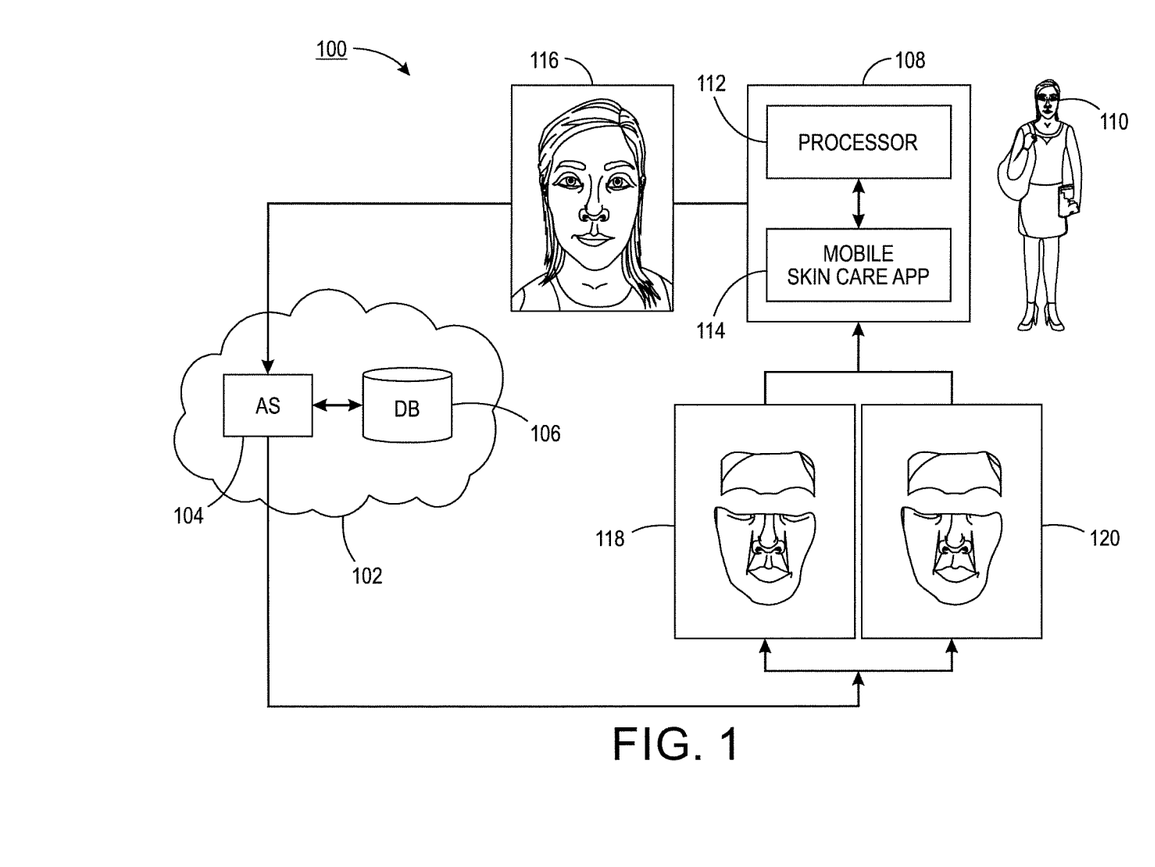
FIG. 1 illustrates an example block diagram of a communication network of the present disclosure.

FIG. 1 illustrates an example system 100 of the present disclosure. In one embodiment, the system 100 may include a communication network 102. The communication network 102 may be any type of wired or wireless communication network. In one embodiment, the communication network 102 may be an Internet Protocol (IP) network.

It should be noted that the communication network 102 has been simplified for ease of explanation. For example, the communication network 102 may include one or more additional network elements (e.g., a router, a gateway, a border element, switches, and the like) or access networks (e.g., a cellular access network, a broadband access network, and the like) that are not shown.

In one embodiment, the communication network 102 may include an application server (AS) 104 and a database (DB) 106. In one embodiment, the AS 104 may establish a wired or wireless connection with one or more mobile endpoint devices 108 to receive and transmit images to the one or more mobile endpoint devices 108 and perform the functions described herein.

In one embodiment, the DB 106 may store various information associated with the functions described herein. For example, the DB 106 may store graphs generated based on training images, one or more images 116 received from the one or more endpoint devices 108 of one or more customers 110, generated graphical chromophore maps 118 and 120, and the like.

It should be noted that although FIG. 1 illustrates a single mobile endpoint device 108, a single customer 110, a single AS 104, and a single DB 106, that any number of mobile endpoint devices, customers, application servers and databases may be deployed. For example, multiple applications servers 104 may be deployed to perform a distributed processing of the images 116. In another example, a plurality of mobile endpoint devices 108 may be sending images of different customers 110 to be analyzed and processed to generate respective graphical chromophore maps for each customer 110.

In one embodiment, the mobile endpoint device 108 may include a processor 112 and a mobile skin care application 114. The mobile skin care application 114 may be used to help provide a customized skincare experience for the customer 110. The mobile skin care application 114 may leverage the camera and/or flash (not shown) of the mobile endpoint device 108 to capture the image 116 of the customer 110. The image 116 may also be referred to as a mobile selfie image. In other words, the image 116 captures a face or headshot of the customer 110.

In one embodiment, the mobile skin care application 114 may send the image 116 to the AS 104 for processing to generate one or more graphical chromophore maps 118 and 120. It should be noted that as the processing power of the mobile endpoint device 108 increases that the functions performed by the AS 104 may be performed by the mobile endpoint device 108. In other words, in one embodiment, image 116 may be analyzed and processed by the mobile endpoint device 108 and the graphical chromophore maps 118 and 120 may be generated and displayed by the mobile endpoint device 108.

As discussed above, to generate accurate graphical chromophore maps 118 and 120, the correct illuminance should be selected to perform an accurate chromophore separation, which in turn, is used to generate the graphical chromophore maps 118 and 120. However, the type of illuminance that was used to generate the image 116 from the customer 110 is typically not provided with the image 116 that is transmitted to the AS 104. Performing an accurate separation of chromophore components from the image 116 can depend on knowing the illuminance that was used.

For example, the graphical chromophore maps 118 and 120 may be generated by converting the image 116 in a red, green, blue (RGB) space into a spectral representation. The response for each color (e.g., red, green, blue) may be a sum of all wavelengths of a function of a spectral reflectance of a skin's surface at a location (x, y), the spectral power distribution of an illuminance, a spectral sensitivity of a camera for each wavelength, as shown by Equation (1) below:

$$\rho_k = \int S(x,y,\lambda)E(\lambda)Q_k(\lambda)d\lambda, \ k=R,G,B, \quad \text{Equation (1):}$$

where $\rho_k$ represents the color response for color k (e.g., red, green or blue), $S(x,y,\lambda)$ represents the spectral reflectance of a skin surface at a location x, y of a two dimensional image, $E(\lambda)$ represents the spectral power distribution of the illuminance, $Q_k(\lambda)$ represents the estimated spectral sensitivity of a camera used to take the image and $\lambda$ represents a wavelength in the spectral representation.

In one embodiment, $Q_k(\lambda)$ can be known in advance for a plurality of different types of cameras or can be estimated from measurements based on the type of camera that is used. For example, if it is known that the images 116 are captured with a particular brand of mobile phone, the spectral sensitivity of the particular brand of mobile phone can be estimated.

As a result, Equation (1) can be rearranged to solve for $S(x,y,\lambda)$, which is then used to perform the chromophore separation. However, in Equation (1) there are two unknowns in $S(x,y,\lambda)$ and $E(\lambda)$. One embodiment of the present disclosure estimates $E(\lambda)$ using an illuminance that is selected based on a correlation of the spectral reflectance of a particular facial region to an absorption curve of a particular chromophore component.

In one embodiment, the present disclosure uses the lip region and the hemoglobin chromophore component. For example, the lip region of a human face contains a large amount of hemoglobin. Thus, the spectral reflectance curve of the lip region should be highly correlated to the absorption curve of hemoglobin.

In one embodiment, the spectral power distribution (e.g., $E(\lambda)$) can be estimated by a selection of an illuminance. The illuminance can be selected based on a plurality of different types of illuminates that are estimated as being used to capture each one of a plurality of training images and determining which illuminance provides a highest correlation. For example, the plurality of training images that were from a plurality of different customers may be stored in the DB 106. A variety of different illuminates, such as, a fluorescent light source (including for example a plurality of different F series), an incandescent light source, a tungsten light source, and the like can be applied to the images to calculate the spectral reflectance of the lip region for the images.

For each image, a correlation coefficient may be calculated between the respective spectral reflectance and the absorption curve of hemoglobin. In one embodiment, the correlation coefficient may be a Pearson correlation coefficient.

Figure 3:
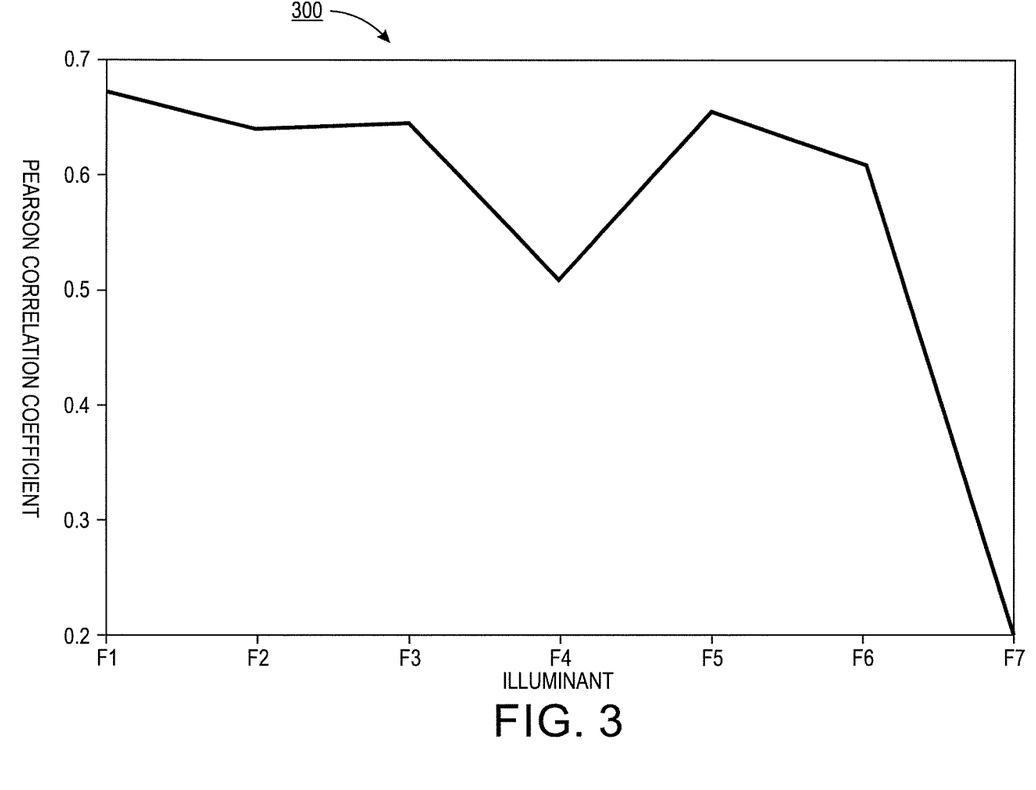
FIG. 3 illustrates an example of a graph of correlations of different illuminates.

FIG. 3 illustrates an example of a graph 300 that illustrates correlations calculated for different types of illuminates. In one example, the illuminates that were estimated included F1-F6 series fluorescent light sources and an A series light source (e.g., an incandescent light source). In one example, the graph 300 illustrates that the F1 illuminance has the highest correlation coefficient. As a result, the spectral power distribution of the F1 illuminance can be inserted into Equation (1) that is rearranged to solve for $S(x,y,\lambda)$.

In one embodiment, once $S(x,y,\lambda)$ is solved, the chromophore separation may be performed and the graphical chromophore maps 118 and 120 may be generated. In one embodiment, the graphical chromophore map 118 may be a melanin graphical chromophore map and the graphical chromophore map 120 may be a hemoglobin graphical chromophore map. Generating accurate melanin and hemoglobin graphical chromophore maps may help to provide accurate health assessments of the skin of the customer 110. In one embodiment, the graphical chromophore maps may be generated more accurately by eliminating a shading component.

For example, melanin occurs at varying depths within the epidermis and is responsible for solar radiation protection and for determining skin color. Melanin is also involved in several human skin pathologies, such as malignant melanoma, albinism, vitiligo and miasma.

Hemoglobin is the pigment related to red blood cells, which are mostly present in vascular densities at the papillary dermis. Some skin conditions, such as acne, rosacea, and telangiectasia may cause organic changes in the vascular structure and elevate the hemoglobin levels. An increased amount of hemoglobin causes a red coloration, and therefore, has a negative impact on skin appearance.

Figure 2:
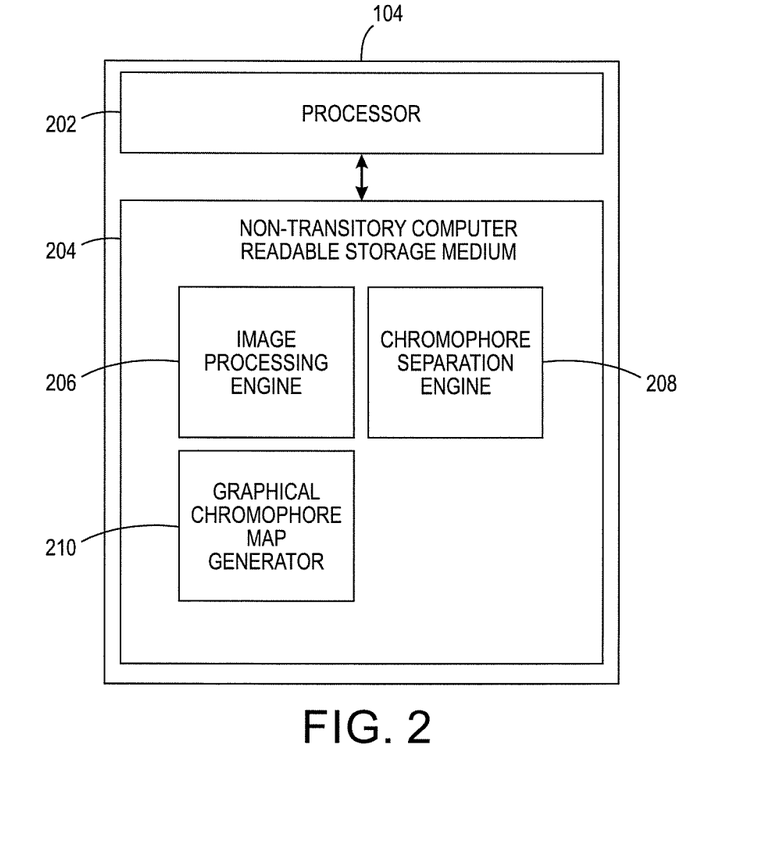
FIG. 2 illustrates an example apparatus of the present disclosure.

FIG. 2 illustrates an example apparatus of the present disclosure. In one embodiment, the apparatus may be the AS 104. In other words, the AS 104 may be a dedicated machine to perform the functions described herein.

In one embodiment, the AS 104 may include a processor 202 and a non-transitory computer readable storage medium 204. In one embodiment, the non-transitory computer readable storage medium 204 may store instructions, or engines, that are executed by the processor 202 to perform the functions described herein.

In one embodiment, the non-transitory computer readable storage medium 204 may include an image processing engine 206, a chromophore separation engine 208, and a graphical chromophore map generator 210. In one embodiment, the image processing engine 206 may analyze a plurality of images (e.g., previously received and stored training images) to estimate and select an illuminance to be used for conversion of the image 116 from an RGB color space to a spectral representation. For example, the spectral representation may comprise conversion of the RGB values of each pixel into corresponding wavelengths of the RGB values.

In one embodiment, the image processing engine 206 may use Equation (1) described above and estimate the spectral power distribution of the illuminance by selecting the illuminance having the highest correlation coefficient. As described above, the correlation coefficients can be calculated by estimating different illuminates that were used to capture the training images and then analyzing the different illuminates. The analysis may include comparing the spectral reflectance of the lip region to an absorption curve of hemoglobin to determine the illuminance that has the highest correlation coefficient.

Then the image processing engine 206 may convert a subsequently received image (e.g., the image 116) in the RGB color space into a spectral representation based on the function described in Equation (1). For example, the function may be based on a response of each color of the RGB color space, a spectral reflectance of a skin surface at a location (x, y), the spectral power distribution of the illuminance that is selected and a spectral sensitivity of a camera. The spectral representations may comprise conversion of the RGB values of each pixel into corresponding wavelengths of the RGB values.

In one embodiment, the chromophore separation engine 208 may perform component analysis on the spectral representation of the image 116 to obtain three independent components. In one embodiment, the three independent components may be a melanin component, a hemoglobin component, and a shading component. In one embodiment, obtaining a separate shading component allows the shading component to be removed from the graphical chromophore maps of the melanin and hemoglobin, thereby providing more accurate graphical chromophore maps.

In one embodiment, the independent components may be obtained from the spectral representation of the image 116 using a constrained independent component analysis (ICA). An example of applying a modified constrained ICA to the spectral representation of the image 116 is described in co-pending U.S. Patent Provisional Application Ser. No. 62/311,175, entitled "METHOD AND APPARATUS FOR GENERATING GRAPHICAL CHROMOPHORE MAPS," filed on Mar. 21, 2016, which is incorporated by reference in its entirety.

In one embodiment, the graphical chromophore map generator 210 may then generate a graphical chromophore map for one or more of the independent components that are separated. In one embodiment, the graphical chromophore map generator 210 may generate a hemoglobin graphical chromophore map 118 and a melanin graphical chromophore map 120. An example of how the graphical chromophore maps 118 and 120 are generated are described in co-pending U.S. Patent Provisional Application Ser. No. 62/311,175, entitled "METHOD AND APPARATUS FOR GENERATING GRAPHICAL CHROMOPHORE MAPS," filed on Mar. 21, 2016, which is incorporated by reference in its entirety.

Figure 4:
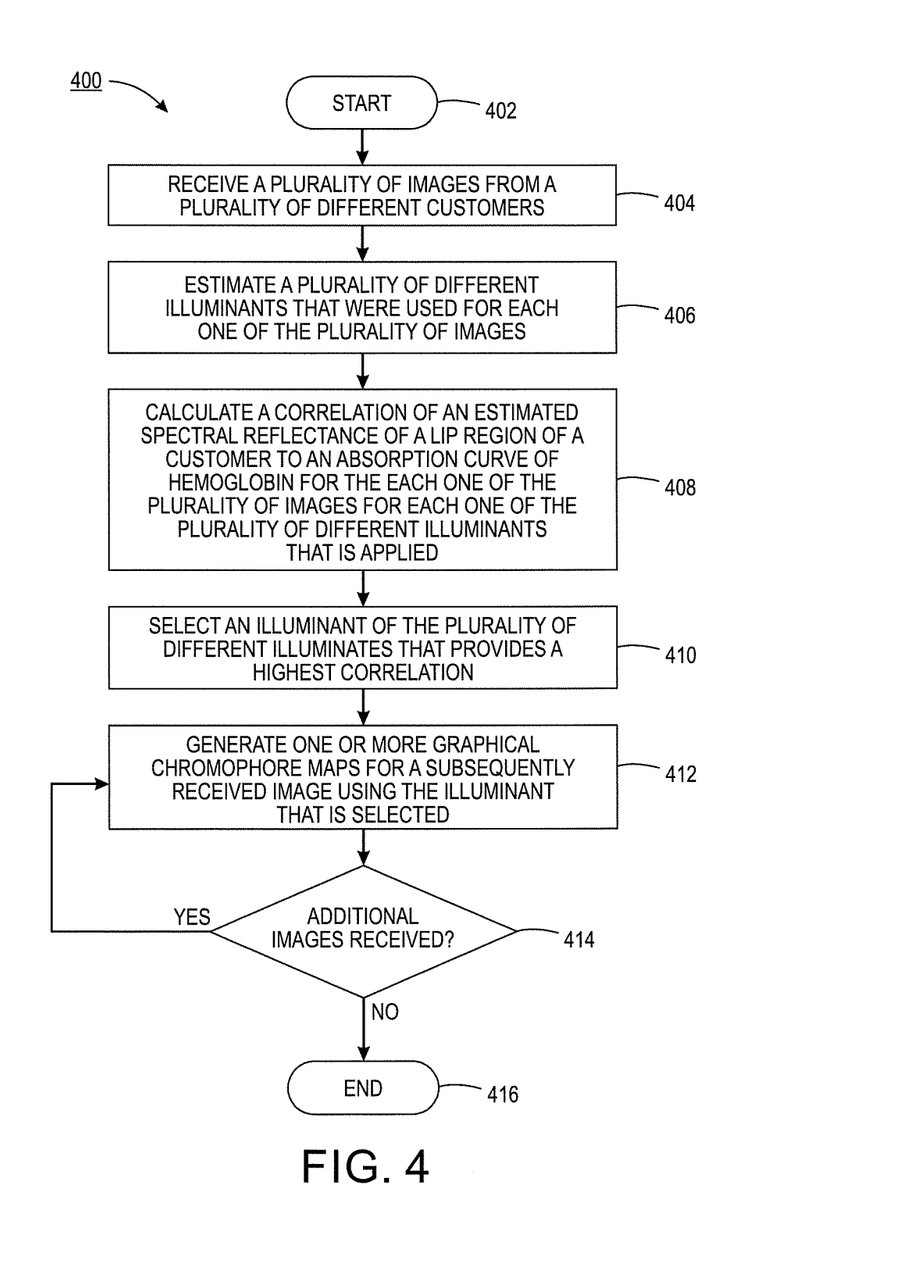
FIG. 4 illustrates a flowchart of an example method for generating one or more graphical chromophore maps.
Figure 5:
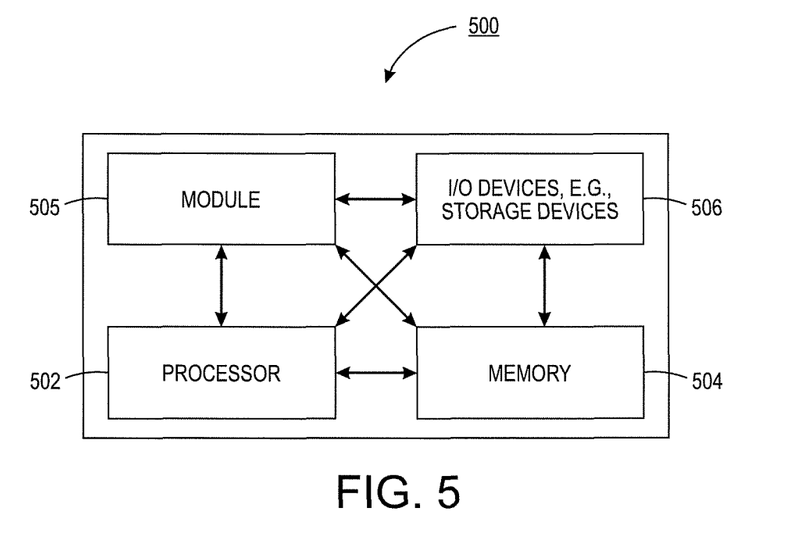
FIG. 5 illustrates a high-level block diagram of a computer suitable for use in performing the functions described herein.

FIG. 4 illustrates a flowchart of a method 400 for generating one or more graphical chromophore maps. In one embodiment, one or more steps or operations of the method 400 may be performed by the AS 104 or a computer as illustrated in FIG. 5 and discussed below.

At block 402, the method 400 begins. At block 404, the method 400 receives a plurality of images from a plurality of different customers. In one embodiment, the plurality of images may be images that were previously sent and stored in a database. The plurality of images may be used as training images to estimate the spectral power distribution of the illuminance that is selected.

In one embodiment, the images may be mobile selfie images. In other words, the images include a face, head or bust of a respective customer that was taken with a mobile endpoint device.

At block 406, the method 400 estimates a plurality of different illuminates that were used to capture each one of the plurality of images. For example, the plurality of different illuminates that were used to capture the images may be estimated and then analyzed to determine the illuminance that should be selected for subsequent images that are received. The estimated spectral power distribution of the illuminance that is selected can then be used to solve for spectral reflectance of the skin surface using Equation (1) described above.

In one embodiment, the different illuminates may include a fluorescent light source, an incandescent light source, a tungsten light source, and the like. In one embodiment, different series within each illuminance may also be used. For example, the fluorescent light source may include a plurality of different F series (e.g., F1-F6).

At block 408, the method 400 calculates a correlation of an estimated spectral reflectance of a lip region of a customer to an absorption curve of hemoglobin for the each one of the plurality of images for each one of the plurality of different illuminates that is estimated. As discussed above, it has been found that correlating the spectral reflectance of the lip region to an absorption curve of hemoglobin may be an accurate way to confirm that a correct illuminance is selected, and thereby, accurately estimating the spectral power distribution of the illuminance in the image that is captured and analyzed.

One reason for the correlation providing accurate results is that the lip region is rich in hemoglobin. In one embodiment, the correlation may be calculated using a Pearson correlation coefficient. The Pearson correlation coefficient may be an average of the correlations between the lip region to the absorption curve of hemoglobin for each one of the plurality of images. The Pearson correlation may be calculated for each one of the different illuminates that is estimated.

At block 410, the method 400 selects an illuminance of the plurality of different illuminates that provides a highest correlation. In one embodiment, the Pearson correlation coefficient may be plotted for each one of the different illuminates that is estimated and the illuminance with the highest Pearson correlation coefficient may be selected. The special power distribution associated with the illuminance that is selected may be used as the estimate for calculating the spectral reflectance of the skin surface using Equation (1) as described above.

At block 412, the method 400 generates one or more graphical chromophore maps for a subsequently received image using the illuminance that is selected. For example, the RGB image can be converted into a spectral representation using the spectral reflectance values that are calculated from Equation (1), described above, using the selected illuminance. In one embodiment, a modified constrained ICA can be applied to the spectral representation to obtain the separate chromophore components. The one or more graphical chromophore maps may be generated using the separate chromophore components. In one embodiment, the separate chromophore components may include melanin and hemoglobin to generate a melanin graphical chromophore map and a hemoglobin graphical chromophore map, respectively.

At block 414, the method 400 determines if additional images are received. For example, if the same customer sends another mobile selfie image for analysis or a different customer sends a mobile selfie image, then the method 400 may return to block 412. However, if no additional images are received, the method 400 may proceed to block 416.

In one embodiment, the method 400 may occasionally return to block 404 and repeat blocks 404-410 to recalibrate the estimation and selection of the illuminance. At block 416, the method 400 ends.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

FIG. 5 depicts a high-level block diagram of a computer that can be transformed to into a machine that is dedicated to perform the functions described herein. As a result, the embodiments of the present disclosure improve the operation and functioning of the computer to improve methods for generating one or more graphical chromophore maps, as disclosed herein.

As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for generating one or more graphical chromophore maps, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for generating one or more graphical chromophore maps (e.g., a software program comprising computer-executable instructions) can be loaded into memory 504 and executed by hardware processor element 502 to implement the steps, functions or operations as discussed above in connection with the exemplary method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for generating one or more graphical chromophore maps (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for generating one or more graphical chromophore maps, comprising:
   receiving, by a processor, a plurality of images from a plurality of different customers;
   estimating, by the processor, a plurality of different illuminants that were used to capture each one of the plurality of images;
   calculating, by the processor, a correlation of a spectral reflectance of a lip region of a customer with an absorption curve of hemoglobin for the each one of the plurality of images for each one of the plurality of different illuminants that is estimated;
   selecting, by the processor, an illuminant from the plurality of different illuminants that provides a highest correlation;
   converting, by the processor, subsequently received images of customers from a red, a green, and a blue (RGB) color space to spectral representation, wherein the converting is based upon a function of a response of each color of the RGB color space, the spectral reflectance of the lip region at a location (x, y), a spectral power distribution of the illuminant that is selected and a spectral sensitivity of a camera; and
   generating, by the processor, the one or more graphical chromophore maps for the subsequently received images of customers using the illuminant that is selected.

2. The method of claim 1, wherein the plurality of different illuminants comprises a fluorescent light source, an incandescent light source, or a tungsten light source.

3. The method of claim 2, wherein the fluorescent light source comprises a plurality of different F series.

4. The method of claim 1, wherein the highest correlation is based on an average of the correlations of the each one of the plurality of images for the each one of the plurality of different illuminants.

5. The method of claim 1, wherein the correlation comprises a Pearson correlation coefficient.

6. The method of claim 1, wherein the one or more graphical chromophore maps are for a melanin content and a hemoglobin content.

7. A non-transitory computer-readable medium storing a plurality of instructions, which when executed by a processor, cause the processor to perform operations for generating one or more graphical chromophore maps, the operations comprising:
   receiving a plurality of images from a plurality of different customers;
   estimating a plurality of different illuminants that were used to capture each one of the plurality of images;
   calculating a correlation of a spectral reflectance of a lip region of a customer with a absorption curve of hemoglobin for the each one of the plurality of images for each one of the plurality of different illuminants that is estimated;
   selecting an illuminant from the plurality of different illuminants that provides a highest correlation;
   converting subsequently received images of customers from a red, a green, and a blue (RGB) color space to spectral representation, wherein the converting is based upon a function of a response of each color of the RGB color space, the spectral reflectance of the lip region at a location (x, y), a spectral power distribution of the illuminant that is selected and a spectral sensitivity of a camera; and
   generating the one or more graphical chromophore maps for the subsequently received images of customers using the illuminant that is selected.

8. The non-transitory computer-readable medium of claim 7, wherein the plurality of different illuminants comprises a fluorescent light source, an incandescent light source, or a tungsten light source.

9. The non-transitory computer-readable medium of claim 8, wherein the fluorescent light source comprises a plurality of different F series.

10. The non-transitory computer-readable medium of claim 8, wherein the one or more graphical chromophore maps are for a melanin content and a hemoglobin content.

11. The non-transitory computer-readable medium of claim 7, wherein the highest correlation is based on an average of the correlations of the each one of the plurality of images for the each one of the plurality of different illuminants.

12. The non-transitory computer-readable medium of claim 7, wherein the correlation comprises a Pearson correlation coefficient.

13. A method for generating one or more graphical chromophore maps, comprising:
   receiving, by a processor, a plurality of images from a plurality of different customers;
   estimating, by the processor, a plurality of different illuminants that were used to capture each one of the plurality of images;
   calculating, by the processor, a Pearson correlation coefficient of a spectral reflectance of a lip region of a customer with an absorption curve of hemoglobin for the each one of the plurality of images for each one of the plurality of different illuminants that is estimated;

selecting, by the processor, an illuminant from the plurality of different illuminants that provides a highest Pearson correlation coefficient;

receiving, by the processor, a subsequent image of a face of a subsequent customer;

converting, by the processor, the subsequent image from a red, a green, and a blue (RGB) color space to spectral representation based upon a function of a response of each color of the RGB color space, the spectral reflectance of the lip region at a location (x, y), a spectral power distribution of the illuminant that is selected and a spectral sensitivity of a camera;

separating, by the processor, a melanin component and a hemoglobin component from the subsequent image in the spectral representation; and generating, by the processor, a melanin graphical chromophore map based on the melanin component and a hemoglobin graphical chromophore map based on the hemoglobin component.

14. The method of claim 13, wherein the plurality of different illuminants comprises a fluorescent light source, an incandescent light source, or a tungsten light source.

15. The method of claim 14, wherein the fluorescent light source comprises a plurality of different F series.

16. The method of claim 13, wherein the highest Pearson correlation coefficient is based on an average of the Pearson correlation coefficient of the each one of the plurality of images for the each one of the plurality of different illuminants.

* * * * *